United States Patent [19]

Bühler

[11] Patent Number: 5,639,282
[45] Date of Patent: Jun. 17, 1997

[54] PROCESS FOR DYEING POLYESTER AND POLYESTER-CONTAINING TEXTILE MATERIALS

[75] Inventor: Ulrich Bühler, Alzenau, Germany

[73] Assignee: Dystar Japan, Ltd., Japan

[21] Appl. No.: 572,855

[22] Filed: Dec. 14, 1995

[30] Foreign Application Priority Data

Dec. 28, 1994 [DE] Germany .................. 44 46 943.8

[51] Int. Cl.$^6$ .................. D06P 3/54; D06P 3/85
[52] U.S. Cl. .................. 8/533; 8/662; 8/693; 8/696; 8/922; 8/933; 8/691
[58] Field of Search .................. 8/531, 533, 662, 8/693, 696, 922, 933, 691

[56] References Cited

U.S. PATENT DOCUMENTS

| 4,035,143 | 7/1977 | Heinrich et al. | 8/512 |
| 4,087,420 | 5/1978 | Heinrich et al. | 534/854 |

FOREIGN PATENT DOCUMENTS

| 2930541 | 12/1981 | Germany . |
| 1512321 | 6/1978 | United Kingdom . |
| 1543724 | 4/1979 | United Kingdom . |

*Primary Examiner*—Margaret Einsmann
*Attorney, Agent, or Firm*—Connolly & Hutz

[57] ABSTRACT

The present invention relates to a process for dyeing polyester or polyester-containing textile materials at pH 8 to pH 11, characterized in that one or more monoazo dyestuffs of the general formula I

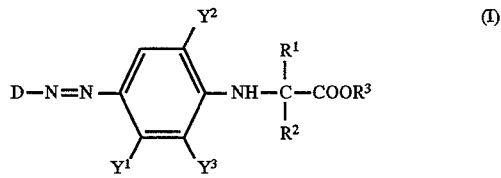

wherein
D is a substituted phenyl radical of the general formula II

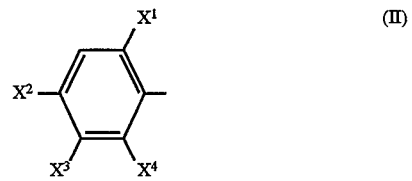

or
5,6-dichlorobenzothiazol-2-yl
6,7-dichlorobenzothiazol-2-yl
6-chlorobenzothiazol-2-yl
5-nitrobenzothiazol-2-yl
6-nitrobenzothiazol-2-yl
6-methylsulphonylbenzothiazol-2-yl or
5-nitrobenzoisothiazol-3-yl
and
$x^1, x^2, x^3, x^4, y^1, y^2, y^3, r^1, r^2$ and $r^3$ are as defined in claim 1, are employed.

12 Claims, No Drawings

PROCESS FOR DYEING POLYESTER AND POLYESTER-CONTAINING TEXTILE MATERIALS

The present invention relates to a process for dyeing textile polyester or polyester-containing textile materials with azo dyestuffs.

As a rule, textile polyester or polyester-containing textile materials are dyed with disperse dyestuffs from an aqueous dyebath under HT conditions in a temperature range from 120° to 140° C. at pH values of 4 to 6, since the disperse dyestuffs are partly or completely destroyed at higher pH values. At higher pH values, losses in depth of colour and deviations in colour shade thus occur during dyeing, and the dyeings are not reproducible. Polyester fibers are thus usually subjected to an alkaline pretreatment in a separate step before the dyeing, in order to remove auxiliaries which have been employed during weaving or spinning of the fibres. These auxiliaries are, for example, oiling or sizing agents, which, if present, would render level dyeing of the polyester fibers difficult or impossible. The alkaline treatment is also carried out in order to destroy oligomers of the polyester fibers, which would emerge from inside the fibers during the dyeing operation and would make the dyeing look uneven, and to keep these in aqueous dye liquor. The oligomers mentioned are particularly undiserable when dyeing yarn since, during spinning of the dyed yarn, they are deposited in powder form by abrasion in the spinning apparatuses at the points where the yarn is deflected. They thus contaminate the apparatus and lead to the yarn tearing.

This alkaline pretreatment is expediently carried out at elevated temperature. To save time and energy and to reduce the number of apparatuses required for the two processes of alkaline pretreatment and dyeing, it has already always been the aim to combine both processes to a one-bath rinsing and dyeing process. However, to realise this aim, processes which give reproducible dyeings in an aqueous dyebath at ph 8 to ph 11 must be developed.

Polyester/cellulose and polyester/polyamide blend fabrics are as a rule dyed with disperse or reactive dyestuffs from an aqueous dyebath in two dyeing steps. As mentioned above, the disperse dyestuffs are applied here to the polyester content at pH 4 to 6, and the reactive dyestuffs are applied to the cellulose or polyamide content in the pH range of between pH 11 and 13. Here also, in the past it has been the aim to develop a onebath application process for both classes of dyestuff. For this, reactive dyestuffs which can already be used for dyeing at pH values of between 8 and 11 have been sought, and here also processes which ensure that the polyester content can be dyed reproducibly with disperse dyestuffs under these conditions were necessary.

To deal with the deficiencies of the processes to date, DE-A 39 38 631 describes a method in which disperse dyestuffs are used for dyeing in the pH range of between pH 8 and 10 in the presence of at least one amino acid optionally substituted on the nitrogen and/or one alkali metal salt of an amino acid optionally substituted on the nitrogen.

In EP-A 501 238, brilliant red dyestuffs, and in EP-A 540 936, clear blue dyestuffs are described, with which dyeing can already be carried out in the pH range of between 8 and 11 even without the aid of an amino acid optionally substituted on the nitrogen and/or an alkali metal salt of an amino acid optionally substituted on the nitrogen. However, these dyestuffs cannot be employed for dyeing in orange shades, deep red or ruby shades or navy blue shades.

The object of the present invention was therefore to provide dyestuffs which are stable to alkali and give orange-coloured, deep red or ruby red and navy blue dyeings with good application properties and good fastness properties in use.

It has now been found, surprisingly, that selected dyestuffs having carboxylic acid ester groups can be employed for dyeing in the pH range of between 8 and 11. These dyestuffs are known in some cases from EP-A 391 121 or DE-A 22 54 017, but without their particular suitability for dyeing under alkaline conditions being known or obvious.

This finding is particularly surprising because dyestuffs which carry at least one carboxylic acid ester group on the chromophore and give prints with sharp contours by alkaline discharge resist printing are already described in GB-A 1 543 724, EP-A 51 261 and EP-A 5266. In this process, as is known, the dyestuffs are destroyed quantitatively by means of an alkaline discharge paste, which in the case of EP-A 51 261 has a pH of at least 8.

The invention thus relates to a process for dyeing polyester or polyester-containing textile materials at pH 8 to pH 11, characterized in that one or more monoazo dyestuffs of the general formula I

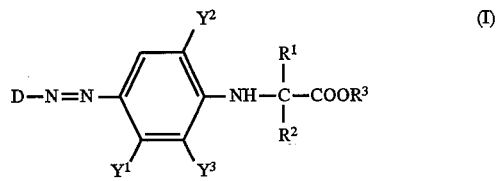

wherein

D is a substituted phenyl radical of the general formula II

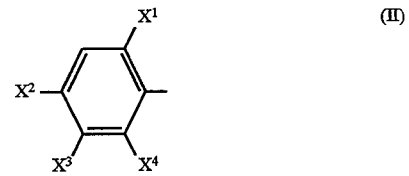

or 5,6-dichlorobenzothiazol-2-yl
6,7-dichlorobenzothiazol-2-yl
6-chlorobenzothiazol-2-yl
5-nitrobenzothiazol-2-yl
6-nitrobenzothiazol-2-yl
6-methylsulphonylbenzothiazol-2-yl or
5-nitorbenzoisothiazol-3-yl and $X^1$ is hydrogen;
  fluorine;
  chlorine;
  bromine;
  methyl;
  trifluoromethyl;
  $(C_1-C_4)$-alkylsulphonyl;
  cyano or
  nitro;

$X^2$ is nitro;
  cyano;
  $(C_1-C_4)$-alkylsulphonyl;
  $(C_1-C_4)$-alkylsulphonyl, which is substituted by hydroxyl, chlorine, bormine, cyano or $(C_1-C_4)$-alkoxy;
  phenylsulphonyl;
  phenylsulphonyl, which is mono- or disubstituted by methyl, ethyl, methoxy, ethoxy, fluorine, chlorine or bromine;

di-($C_1$–$C_4$)-alkylaminosulphonyl;
di-($C_1$–$C_4$)-alkylaminosulphonyl, wherein one or both alkyl groups independently of one another are substituted by hydroxyl, chlorine, bromine, cyano, phenyl, phenoxy or ($C_1$–$C_4$)-alkoxy;
($C_1$–$C_4$)-alkylcarbonyl;
($C_1$–$C_4$)-alkylcarbonyl, which is substituted by hydroxyl, chlorine, bromine, cyano, ($C_1$–$C_4$)-alkoxy, phenoxy or phenyl;
phenylcarbonyl;
phenylcarbonyl, which is mono- or disubstituted by methyl, ethyl, methoxy, ethoxy, fluorine, chlorine or bromine;
aminocarbonyl;
phenylaminocarbonyl;
phenylaminocarbonyl, which is mono- or disubstituted by methyl, ethyl, methoxy, ethoxy, fluorine, chlorine or bromine;
($C_1$–$C_4$)-alkylaminocarbonyl;
($C_1$–$C_4$)-alkylaminocarbonyl, which is substituted by hydroxyl, chlorine, bromine, cyano, phenyl, phenoxy or ($C_1$–$C_4$)-alkoxy;
di-($C_1$–$C_4$)-alkylaminocarbonyl;
di-($C_1$–$C_4$)-alkylaminocarbonyl, wherein one or both alkyl groups independently of one another are substituted by hydroxyl, chlorine, bromine, cyano, phenyl, phenoxy or ($C_1$–$C_4$)-alkoxy;
trifluoromethyl;
fluorine;
chlorine;
bromine;
($C_1$–$C_6$)-alkyl;
cyclopentyl;
cyclohexyl;
($C_1$–$C_4$)-alkoxy;
($C_1$–$C_4$)-alkoxy, which is substituted by ($C_1$–$C_4$)-alkoxy or hydroxyl;
hydrogen;
$X^3$ is fluorine;
chlorine;
bromine;
($C_1$–$C_4$)-alkoxy or hydrogen;
$X^4$ is cyano;
fluorine;
chlorine;
bromine or hydrogen;
$Y^1$ is hydrogen;
fluorine;
chlorine;
bromine;
methyl;
ethyl;
($C_1$–$C_4$)-alkoxy;
$NHCOR^4$;
$NHCOOR^4$ or $NHSO_2R^5$ or
$Y^1$ and $Y^3$, together with the benzene nucleus carrying them, form a naphthyl radical;
$Y^2$ is hydrogen;
fluorine;
chlorine;
methyl;
($C_1$–$C_4$)-alkoxy or
($C_1$–$C_4$)-alkoxy, which is substituted by ($C_1$–$C_4$)-alkoxy or hydroxyl;
$R^1$ is ($C_1$–$C_6$)-alkyl;
$R^2$ is ($C_1$–$C_6$)-alkyl or hydrogen;

$R^3$ is ($C_1$–$C_8$)-alkyl;
($C_1$–$C_8$)-alkyl, which is substituted by chlorine, bromine, cyano, hydroxyl, ($C_1$–$C_8$)-alkoxy or phenoxy;
phenyl;
($C_3$–$C_5$)-alkenyl;
cyclopentyl;
cyclohexyl;
benzyl or ($C_1$–$C_8$)-alkyl, the hydrocarbon chain of which is interrupted by 2 or 3 oxygen atoms;
$R^4$ is ($C_1$–$C_4$)-alkyl;
($C_1$–$C_4$)-alkyl, which is substituted by chlorine, bromine, ($C_1$–$C_4$)-alkoxy, cyano, hydroxyl or phenyl;
phenyl and
$R^5$ is ($C_4$–$C_6$)-alkyl
are employed.

Alkyl and alkoxy groups can be straight-chain or branched, primarily branched groups being preferred and straight-chain groups being particularly preferred.

($C_1$–$C_4$)-Alkyl is, for example, methyl, ethyl, n-propyl, i-propyl, n-butyl, i-butyl and sec-butyl. An analogous definition applies to groups such as ($C_1$–$C_4$)-alkylcarbonyl, ($C_1$–$C_4$)-alkoxy and the like. ($C_1$–$C_8$)-Alkyl furthermore can be n-pentyl, i-pentyl, sec-pentyl, n-hexyl, i-hexyl, n-octyl or i-octyl.

($C_1$–$C_4$)-Alkyl substituted by hydroxyl or ($C_1$–$C_4$)-alkoxy is, for example, 2-hydroxyethyl, 4-hydroxybutyl, 2,3-dihydroxypropyl, 2-methoxy-, 2-ethoxy-, 2-n-propoxy-, 2-i-propoxy-, 2-n-butoxy-, 2-i-butoxy-, 2-sec-butoxy- or 2-tert-butoxyethyl, 3-methoxy-, 3-ethoxy-, 3-n-propoxy-, 3-i-propoxy-, 3-n-butoxy- or 3-sec-butoxypropyl, 4-methoxy-, 4-ethoxy-, 4-n-propoxy- or 4-n-butoxybutyl or 2-hydroxy-3-methoxy-, -3-ethoxy- or -3-n-butoxypropyl.

($C_1$–$C_8$)-Alkyl substituted by hydroxyl or ($C_1$–$C_4$)-alkoxy is moreover, for example, 6-hydroxyhexyl, 6-methoxy- or 6-ethoxyhexyl, 3-hydroxy- or 3-methoxy-2,2-dimethylpropyl or -2,2-diethylpropyl, 6-hydroxy- or 6-methoxy-2-methylhexyl or -3-methylhexyl, 4-hydroxy-4-methyl-2-pentyl, 3-hydroxy-2-ethylhexyl or 3-hydroxy-2,2-dimethylhexyl.

($C_1$–$C_4$)-Alkyl substituted by phenoxy or phenyl is, for example, phenoxymethyl, -ethyl, -propyl and -butyl, benzyl, phenethyl and phenpropyl.

($C_1$–$C_8$)-Alkyl substituted by phenoxy or phenyl is furthermore, for example, 6-phenoxy- or 6-phenylhexyl.

($C_1$–$C_4$)-Alkyl substituted by chlorine, bromine or cyano is, for example, 2-chloro-, 2-bromo- or 2-cyano-ethyl, or 4-chloro- or 4-cyanobutyl.

($C_1$–$C_8$)-Alkyl substituted by chlorine, bromine or cyano is furthermore, for example 6-chloro- or 6-cyano-hexyl.

Substituted ($C_1$–$C_4$)-alkoxy is, for example, 2-hydroxyethoxy, 4-hydroxybutoxy, 2-hydroxypropoxy, 2,3-dihydroxypropoxy, 2-methoxy-, 2-ethoxy-, 2-n-propoxy-, 2-i-propoxy-, 2-n-butoxy-, 2-i-butoxy- or 2-tert-butoxy-ethoxy, 3-methoxypropoxy, 4-methoxy-, 4-ethoxy- or 4-n-butoxybutoxy, 2-phenoxyethoxy, 4-phenoxyethoxy, benzyl-oxy, phenethoxy and 3-phenpropoxy.

($C_1$–$C_8$)-Alkyl, the carbon chain of which is interrupted by 2 or 3 oxygen atoms, is, for example, methoxy- or n-butoxy-ethoxyethoxy or methoxybutoxyethoxy.

Alkyl in optionally substituted di-($C_1$–$C_4$)-alkylaminosulphonyl, ($C_1$–$C_4$)-alkylaminocarbonyl and di-($C_1$–$C_4$)-alkylaminocarbonyl $X^2$ is preferably linear ($C_2$–$C_4$)-alkyl.

If D is a radical of the general formula II, preferably
$X^1$ is hydrogen, chlorine, bromine, methylsulphonyl or nitro;

$X^2$ is chlorine, bromine, nitro, ($C_1$–$C_4$)-alkylsulphonyl, di-($C_2$–$C_4$)-alkylaminosulphonyl, ($C_2$–$C_4$)-alkylaminocarbonyl, di-($C_2$–$C_4$)-alkylaminocarbonyl, ($C_1$–$C_4$)-alkylcarbonyl or phenylcarbonyl, and if $X^1$ and $X^4$ are cyano, furthermore also hydrogen, ($C_1$–$C_4$)-alkyl, ($C_1$–$C_4$)-alkoxy, chlorine or bromine;

$X^3$ is chlorine or in particular hydrogen;

$X^4$ is hydrogen, chlorine or bromine;

$Y^1$ is hydrogen, methyl, methoxy, ethoxy, chlorine, NHCOR$^4$ or NHCOOR$^4$, or, if $Y^2$ is hydrogen, together with $Y^3$ and the benzene nucleus carrying them is a naphthyl radical;

$Y^2$ is hydrogen, chlorine, methoxy or ethoxy;

$Y^3$ is hydrogen;

$R^1$ and $R^2$ independently of one another are methyl or ethyl, in particular methyl;

$R^3$ is unsubstituted linear or iso-($C_1$–$C_8$)-alkyl and in particular ($C_4$–$C_6$)-alkyl; and $R^4$ is ($C_1$–$C_4$)-alkyl or phenyl, if $Y^1$ is NHCOR$^4$, and ($C_2$–$C_4$)-alkyl, if $Y^1$ is NHCOOR$^4$.

If D is a radical of the general formula II, particularly preferably $X^1$ is hydrogen, chlorine, bromine or methylsulphonyl;

$X^2$ is nitro;

$X^3$, $X^4$, $Y^2$ and $Y^3$ are hydrogen; and $Y^1$ is hydrogen, methyl, methoxy, ethoxy, NHCOR$^4$ or NHCOOR$^4$;

or $X^1$ is nitro;

$X^2$ is chlorine, bromine, ($C_1$–$C_4$)-alkylsulphonyl, di-($C_1$–$C_4$)-alkylsulphonyl, ($C_1$–$C_4$)-alkylaminocarbonyl, di-($C_1$–$C_4$)-alkylaminocarbonyl, ($C_1$–$C_4$)-alkylcarbonyl or phenylcarbonyl;

$X^3$, $X^4$, $Y^2$ and $Y^3$ are hydrogen; and $Y^1$ is hydrogen, methyl, methoxy, ethoxy, NHCOR$^4$ or NHCOOR$^4$;

or $X^1$ and $X^4$ are cyano;

$X^2$ is hydrogen, ($C_1$–$C_4$)-alkyl, ($C_1$–$C_4$)-alkoxy, chlorine or bromine;

$X^3$, $Y^2$ and $Y^3$ are hydrogen; and $Y^1$ is NHCO($C_2$–$C_4$)-alkyl or NHCOO($C_2$–$C_4$)-alkyl;

or $X^1$ and $X^2$ are nitro;

$X^3$ and $Y^2$ are hydrogen;

$X^4$ is hydrogen, chlorine or bromine; and $Y^1$ and $Y^3$, together with the benzene nucleus carrying them, are a naphthyl radical.

If D is a radical of the general formula II, especially preferably $X^1$ is hydrogen, chlorine or bromine;

$X^2$ is nitro;

$X^3$, $X^4$, $Y^2$ and $Y^3$ are hydrogen;

$Y^1$ are NHCOR$^4$;

$R^1$ and $R^2$ are methyl; and $R^3$ is ($C_4$–$C_6$)-alkyl.

In addition to the radical of the general formula II, D is preferably 5,6-dichlorobenzothiazol-2-yl, 6,7-dichlorobenzothiazol-2-yl or 6-nitrobenzothiazol-2-yl.

Preferred dyestuffs of the general formula I to be employed according to the invention are those which have the features described above as preferred. Particularly preferred dyestuffs have several of the features described above as preferred.

The dyestuffs of the general formula I can be prepared by a procedure in which a compound of the general formula III $$X^2 \underset{X^3}{\overset{X^1}{\underset{X^4}{\bigoplus}}} NH_2 \quad (III)$$

wherein $X^1$, $X^2$, $X^3$ and $X^4$ are as defined above, or 2-amino-5,6-dichloro-, -6,7-dichloro-, -6-chloro-, -5-nitro-, -6-nitro- or -6-methylsulphonylbenzothiazole or 3-amino-5-nitrobenzisothiazole is diazotized and the diazotization product is coupled to a compound of the general formula IV $$\underset{Y^1}{\overset{Y^2}{\underset{Y^2}{\bigoplus}}} NH-\underset{R^2}{\overset{R^1}{\underset{|}{C}}}-COOR^3 \quad (IV)$$

The procedure required for this is known to the expert and described, for example, in DE-A 22 54 017.

Dyestuffs of the general formula I in which D is a radical of the general formula II where $X^1$ and $X^4$=cyano can be obtained by methods known to the expert for the preparation of dicyano-azo dyestuffs. In particular, these dyestuffs can be obtained by cyano exchange from compounds of the general formula V $$X^2 \underset{X^3}{\overset{Y}{\underset{Hal}{\bigoplus}}}-N=N-\underset{Y^1}{\overset{Y^2}{\underset{Y^3}{\bigoplus}}}-NH-\underset{R^2}{\overset{R^1}{\underset{|}{C}}}-COOR^3 \quad (V)$$

wherein

Y is cyano or Hal; Hal is chlorine or, in particular, bromine and $X^2$, $X^3$, $Y^1$, $Y^2$, $Y^3$, $R^1$, $R^2$ and $R^3$ are as defined above. The cyano exchange process is described, for example, in DE-A 27 11 130. The preparation can also be carried out analogously to the instructions in EP-A 391 121.

The process according to the invention can be carried out with a dyestuff of the general formula I. However, it can also be carried out with two, three or four dyestuffs of the general formula I, two or three dyestuffs being preferred. The content of a dyestuff in these cases is preferably 5 to 95% by weight, in each these cases is preferably 5 to 95% by weight, in each case based on the total amount of dyestuff.

Mixtures of two dyestuffs of the general formula I, in which D is 5,6- or 6,7-dichlorobenzothiazol-2-yl, for example, are preferred.

If several dyestuffs of the general formula I are employed, these preferably differ only little or do not differ in colour shade.

The process according to the invention is preferably carried out under HT conditions, i.e. in an aqueous dye liquor at temperatures of between 120° C. and 140° C. in a dyeing autoclave. The pH is preferably pH 9 to pH 10.

The polyesters to be dyed by the process according to the invention are, in particular, those based on polyethylene glycol terephthalates. Polyester-containing textile materials are, for example, mixtures of polyesters and polyamides.

The dyestuffs or dyestuff mixtures are employed in fine division in the process according to the invention.

The dyestuffs are finely divided in a manner known per se by suspending the dyestuff obtained in the manufacture in a liquid medium, preferably in water, together with dispersing agents and exposing the mixture to the action of shearing forces, the dyestuff particles originally present being comminuted mechanically to the extent that an optimum specific surface area is achieved and sedimentation of the dyestuff is as low as possible. The particle sizes of the dyestuffs are in general between 0.5 and 5 μm, preferably about 1 μm.

The dispersing agents co-used in the grinding operation can be nonionic or anionic. Nonionic dispersing agents are, for example, reaction products of alkylene oxides, such as, for example, ethylene oxide or propylene oxide, with alkylatable compounds, such as, for example, fatty alcohols, fatty amine, fatty acids, phenols, alkylphenols and carboxylic acid amides. Anionic dispersing agents are, for example, ligninsulphonates, alkyl- or alkylarylsulphonates or alkylaryl polyglycol ethersulphonates.

The dyestuff formulations thus obtained should be pourable for most methods of application. In these cases, the content of dyestuff and dispersing agent is therefore limited. In general, the dispersions are adjusted to a dyestuff content of up to 25% by weight and a dispersing agent content of up to about 25% by weight. For economic reasons, the dyestuff contents usually do not fall below 15% by weight.

The dispersions can also comprise further auxiliaries, for example those which act as oxidizing agents, such as, for example, sodium m-nitrobenzenesulphonate, or fungicidal agents, such as, for example, sodium o-phenylphenolate.

For certain fields of use, powder formulations are preferred. These powders comprise the dyestuff or the dyestuff mixture, dispersing agent and other auxiliaries, such as, for example, wetting agents, oxidizing agents, preservatives and dust removal agents.

A preferred preparation process for pulverulent dyestuff formulations comprises withdrawing the liquid from the liquid dyestuff dispersions described above, for example by vacuum drying, freeze drying, by drying on roller driers, but preferably by spray drying.

To prepare the dye liquors, the required amounts of the dyestuff formulations which have been prepared in accordance with the above instructions are diluted with the dye medium, preferably with water, such that a liquor ratio of 1:5 to 1:50 results for dyeing. Further dyeing auxiliaries, such as dispersing, wetting and fixing auxiliaries, are in general additionally added to the liquors.

The pH required for the dye liquor is established before or also during dyeing by addition of bases, such as alkali metal hydroxides, for example aqueous sodium hydroxide solution, alkali metal bicarbonates, for example sodium bicarbonate, or alkali metal carbonates, for example sodium carbonate.

To minimize variations in pH, buffer substances such as are described, for example, in JSDC 77 (1979), page 47, or JSDC 79 (1981), page 115, are preferably added. Particularly suitable buffer substances are those which have the greatest buffering action in the pH range between 9 and 11. Suitable buffer systems are, for example, acetic acid/sodium pyrophosphate, boric acid/borax, sodium bicarbonate/sodium carbonate, sodium dihydrogen phosphate/disodium hydrogen phosphate, phosphoric acid/succinic acid/boric acid or combinations of organic phosphorus compounds with polycarboxylic acids. The amounts of buffer system employed are preferably between 0.5 and 10 g/l.

The amino acids described in DE-A 39 38 631 can also be employed as buffer systems in the manner described therein.

EXAMPLE 1

1 g of a 20% strength powder preparation of the dyestuff of the formula Ia

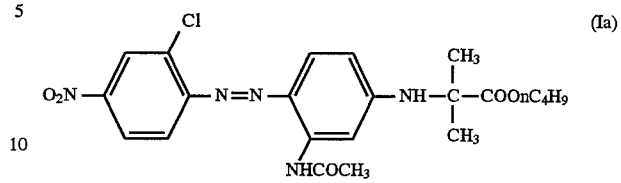

are used for dyeing in a dyeing autoclave from a dye liquor comprising 2 l of water, 2 g of a dyeing auxiliary based on a formaldehyde condensation product and 5 g of a buffer substance which is a mixture of an organic phosphorus compound and a polycarboxylic acid on 100 g of a fabric of polyethylene terephthalate at 130° C. for 45 minutes, after the pH of the dye liquor has first been brought to 10 with aqueous sodium hydroxide solution. The dyeing is then rinsed, cleaned reductively and rinsed and dried. A red dyeing is thus obtained.

Comparison Experiment 1:

The dyeing is repeated, 4 g of sodium acetate now being added as the buffer substance and the pH of the dye liquor being brought to 4.5 with acetic acid. The resulting dyeing is virtually the same in depth of colour and colour shade, and the dyestuff has practically not decomposed at pH 10.

EXAMPLE 2

Instead of the dyestuff of the formula Ia, 2 g of a 15% strength liquid preparation of the dyestuff of the formula Ib $$O_2N-\bigodot-N=N-\underset{NHCOCH_3}{\bigodot}-NH-\underset{CH_3}{\overset{CH_3}{\underset{|}{C}}}-COOnC_4H_9 \quad (Ib)$$

are employed in Example 1, and instead of the buffer substance in Example 1, 6 g of borax are employed, and the subsequent procedure is as described in Example 1. A scarlet-coloured fabric which is virtually identical in depth of colour and colour shade to a fabric dyed at pH 4.5 for comparison is obtained.

EXAMPLE 3

Instead of the dyestuff Ia, 3 g of a 20% strength powder preparation of the dyestuff of the formula Ic $$O_2N-\underset{Cl}{\overset{NO_2}{\bigodot}}-N=N-\bigodot-NH-\underset{CH_3}{\overset{CH_3}{\underset{|}{C}}}-COOnC_4H_9 \quad (Ic)$$

are employed in Example 1, and instead of the buffer substance in Example 1, 1 g of sodium carbonate and 1 g of sodium bicarbonate are employed and dyeing is carried out from 1 l of dye liquor at the pH of 10 thus established. A navy blue dyeing which is virtually identical in depth of colour and colour shade to one dyed at pH 5 for comparison is obtained.

Further dyestuffs which can be employed in the process according to the invention are listed in the following tables. They dye polyester in orange-coloured to navy blue shades.

TABLE 1

O₂N—[benzene with X¹]—N=N—[benzene with Y¹]—NH—C(R¹)(R²)—COOR³

| X¹ | Y¹ | R¹ | R² | R³ |
|---|---|---|---|---|
| Br | NHCOCH₃ | CH₃ | CH₃ | nC₄H₉ |
| SO₂CH₃ | NHCOCH₃ | CH₃ | CH₃ | iC₃H₇ |
| Cl | NHCOC₂H₅ | CH₃ | CH₃ | nC₄H₉ |
| H | NHCOnC₃H₇ | CH₃ | CH₃ | (CH₂)₂OC₆H₅ |
| Cl | NHCOOC₂H₅ | C₂H₅ | H | iC₆H₁₃ |
| CN | NHCOC₆H₅ | CH₃ | C₂H₅ | nC₄H₉ |
| CH₃ | NHCO(CH₂)₂Cl | CH₃ | CH₃ | iC₄H₉ |
| H | NHCO(CH₂)₂OC₂H₅ | CH₃ | CH₃ | nC₅H₁₁ |
| Cl | Cl | CH₃ | C₂H₅ | (CH₂)₂C₆H₅ |
| CF₃ | CH₃ | C₂H₅ | C₂H₅ | (CH₂)₂Cl |
| SO₂CH₃ | CH₃ | nC₃H₇ | nC₃H₇ | [(CH₂)₂O]₂C₂H₅ |
| Br | OCH₃ | CH₃ | CH₃ | nC₄H₉ |
| SO₂C₂H₅ | OC₂H₅ | CH₃ | CH₃ | iC₃H₇ |
| Cl | NHSO₂nC₄H₉ | CH₃ | CH₃ | iC₈H₁₇ |
| NO₂ | H | CH₃ | CH₃ | iC₅H₁₁ |
| Cl | H | CH₃ | C₂H₅ | sec. C₄H₉ |
| SO₂CH₃ | H | C₂H₅ | H | (CH₂)₂OnC₄H₉ |
| Br | H | CH₃ | CH₃ | nC₄H₉ |

TABLE 2

X²—[benzene with NO₂]—N=N—[benzene with Y¹]—NH—C(R¹)(R²)—COOR³

| X² | Y¹ | R¹ | R² | R³ |
|---|---|---|---|---|
| Cl | NHCOiC₃H₇ | C₂H₅ | CH₃ | nC₃H₇ |
| SO₂CH₃ | NHSO₂nC₄H₉ | CH₃ | CH₃ | (CH₂)₂OiC₃H₇ |
| SO₂C₂H₅ | OCH₃ | C₂H₅ | C₂H₅ | nC₄H₉ |
| SO₂N(C₂H₅)₂ | NHCOCH₂OCH₃ | CH₃ | CH₃ | iC₈H₁₇ |
| CONHnC₄H₉ | OCH₃ | CH₃ | CH₃ | iC₄H₉ |
| CONH(CH₂)₂OnC₄H₉ | CH₃ | CH₃ | CH₃ | (CH₂)₄OC₂H₅ |
| CON(C₂H₅)₂ | Cl | C₂H₅ | H | iC₃H₇ |
| CON(nC₄H₉)₂ | NHCOCH₃ | nC₃H₇ | H | (CH₂)₂OC₆H₅ |
| COiC₃H₇ | NHCOOnC₄H₉ | CH₃ | CH₃ | CH₂CH=CH₂ |
| COC₆H₅ | NHCOC₂H₅ | nC₄H₉ | nC₄H₉ | C₂H₅ |

TABLE 3

| X² | Y¹ | R¹ | R² | R³ |
|---|---|---|---|---|
| Cl | NHCOnC₃H₇ | CH₃ | CH₃ | nC₅H₁₁ |
| Cl | OC₂H₅ | CH₃ | CH₃ | (CH₂)₂OC₆H₅ |
| Br | NHCOOnC₄H₉ | C₂H₅ | CH₃ | (CH₂)₄CN |
| Br | NHSO₂nC₄H₉ | CH₃ | CH₃ | iC₄H₉ |
| CH₃ | NHCOiC₃H₇ | C₂H₅ | H | iC₆H₁₃ |
| CH₃ | OCH₃ | C₂H₅ | C₂H₅ | iC₃H₇ |
| OCH₃ | NHCO(CH₂)₂Cl | CH₃ | CH₃ | (CH₂)₂C₆H₅ |
| CONHCH₂CH(C₂H₅)nC₄H₉ | CH₃ | CH₃ | CH₃ | nC₄H₉ |
| SO₂nC₄H₉ | H | CH₃ | CH₃ | cyclo C₆H₁₁ |

TABLE 4

| X⁴ | R¹ | R² | R³ |
|---|---|---|---|
| Br | CH₃ | CH₃ | nC₄H₉ |
| Cl | CH₃ | CH₃ | nC₆H₁₃ |
| Cl | CH₃ | CH₃ | (CH₂)₂OnC₄H₉ |
| Br | C₂H₅ | H | (CH₂)₂C₆H₅ |

TABLE 5

| X¹ | X² | X³ | X⁴ | Y¹ | Y² | R³ |
|---|---|---|---|---|---|---|
| Cl | NO₂ | Cl | H | NHSO₂nC₅H₁₁ | H | nC₅H₁₁ |
| Cl | SO₂N(CH₃)₂ | Cl | H | NHCOOCH₃ | H | iC₃H₇ |
| NO₂ | NO₂ | H | Cl | NHCOiC₃H₇ | OCH₃ | nC₄H₉ |
| Cl | NO₂ | H | H | NHCOC₂H₅ | Cl | (CH₂)₄OCH₃ |
| Cl | NO₂ | H | Cl | CH₃ | OCH₃ | CH₂CH=CH₂ |
| Cl | NO₂ | H | Cl | OCH₃ | H | iC₄H₉ |
| Br | NO₂ | H | Br | H | H | CH₂C₆H₅ |
| NO₂ | CON(nC₄H₉)₂ | H | Br | CH₃ | H | (CH₂)CN |

TABLE 6

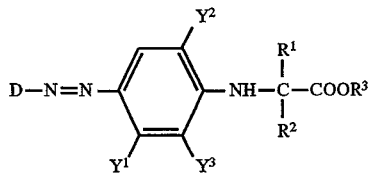

| $X^5$ | $X^6$ | $Y^1$ | $Y^2$ | $R^1$ | $R^2$ | $R^3$ |
|---|---|---|---|---|---|---|
| 5-Cl | 6-Cl | H | H | $CH_3$ | $CH_3$ | $(CH_2)_2C_6H_5$ |
| 5-Cl | 6-Cl | $CH_3$ | H | $C_2H_5$ | H | $(CH_2)_2OiC_4H9$ |
| 6-Cl | 7-Cl | H | H | $CH_3$ | $CH_3$ | $iC_3H_7$ |
| 6-Cl | 7-Cl | $NHSO_2nC_4H_9$ | H | $CH_3$ | $CH_3$ | $CH_2CH=CH_2$ |
| 50% 5-Cl | 6-Cl | H | H | $CH_3$ | $CH_3$ | $nC_4H_9$ |
| 50% 7-Cl | 6-Cl | H | H | $CH_3$ | $CH_3$ | $nC_4H_9$ |
| 60% 5-Cl | 6-Cl | $CH_3$ | H | $CH_3$ | $CH_3$ | $(CH_2)_2OC_6H_5$ |
| 60% 7-Cl | 6-Cl | $CH_3$ | H | $CH_3$ | $CH_3$ | $(CH_2)_2OC_6H_5$ |
| 6-Cl | H | $NHCOC_2H_5$ | H | $nC_3H_7$ | $CH_3$ | $(CH_2)_4OH$ |
| 5-$NO_2$ | H | $NHCOCH_3$ | Cl | $C_2H_5$ | H | $iC_6H_{13}$ |
| 5-$NO_2$ | H | H | H | $CH_3$ | $CH_3$ | $(CH_2)_2C_6H_5$ |
| 6-$NO_2$ | H | $NHCO(CH_2)_2OCH_3$ | Cl | $C_2H_5$ | H | $nC_5H_{11}$ |
| 6-$NO_2$ | H | $CH_3$ | H | $CH_3$ | $CH_3$ | cyclo-$C_5H_9$ |
| 6-$NO_2$ | H | H | H | $C_2H_5$ | $C_2H_5$ | $(CH_2)_2CN$ |
| 6-$SO_2CH_3$ | H | $nC_3H_7$ | H | $CH_3$ | $CH_3$ | $nC_4H_9$ |

We claim:

1. A process for dyeing polyester or polyester-containing textile materials comprising contacting a polyester or polyester-containing textile material at a pH of 9 to about 11 with one or more monoazo dyestuffs of the formula I

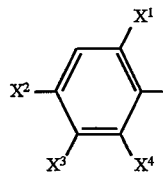

wherein

D is a substituted phenyl radical of the formula II $$\text{(II)}$$

or 5,6-dichlorobenzothiazol-2-yl
6,7-dichlorobenzothiazol-2-yl
6-chlorobenzothiazol-2-yl
5-nitrobenzothiazol-2-yl
6-nitrobenzothiazol-2-yl
6-methylsulphonylbenzothiazol-2-yl or
5-nitrobenzoisothiazol-3-yl and $X^1$ is hydrogen;
fluorine;
chlorine;
bromine;
methyl;
trifluoromethyl;
$(C_1-C_4)$-alkylsulphonyl;
cyano or nitro;

$X^2$ is nitro;
cyano;
$(C_1-C_4)$-alkylsulphonyl;
$(C_1-C_4)$-alkylsulphonyl, which is substituted by hydroxyl, chlorine, bromine, cyano or $(C_1-C_4)$-alkoxy;
phenylsulphonyl;
phenylsulphonyl, which is mono- or disubstituted by methyl, ethyl, methoxy, ethoxy, fluorine, chlorine or bromine;
di-$(C_1-C_4)$-alkylaminosulphonyl;
di-$(C_1-C_4)$-alkylaminosulphonyl, wherein one or both alkyl groups independently of one another are substituted by hydroxyl, chlorine, bromine, cyano, phenyl, phenoxy or $(C_1-C_4)$-alkoxy;
$(C_1-C_4)$-alkylcarbonyl;
$(C_1-C_4)$-alkylcarbonyl, which is substituted by hydroxyl, chlorine, bromine, cyano, $(C_1-C_4)$-alkoxy, phenoxy or phenyl;
phenylcarbonyl;
phenylcarbonyl, which is mono- or disubstituted by methyl, ethyl, methoxy, ethoxy, fluorine, chlorine or bromine;
aminocarbonyl;
phenylaminocarbonyl;
phenylaminocarbonyl, which is mono- or disubstituted by methyl, ethyl, methoxy, ethoxy, fluorine, chlorine or bromine;
$(C_1-C_4)$-alkylaminocarbonyl;
$(C_1-C_4)$-alkylaminocarbonyl, which is substituted by hydroxyl, chlorine, bromine, cyano, phenyl, phenoxy or $(C_1-C_4)$-alkoxy;
di-$(C_1-C_4)$-alkylaminocarbonyl;
di-$(C_1-C_4)$-alkylaminocarbonyl, wherein one or both alkyl groups independently of one another are substituted by hydroxyl, chlorine, bromine, cyano, phenyl, phenoxy or $(C_1-C_4)$-alkoxy;
trifluoromethyl;
fluorine;
chlorine;
bromine;
$(C_1-C_6)$-alkyl;

cyclopentyl;
cyclohexyl;
$(C_1-C_4)$-alkoxy;
$(C_1-C_4)$-alkoxy, which is substitued by $(C_1-C_4)$-alkoxy or hydroxyl; or
hydrogen;

$X^3$ is fluorine;
chlorine;
bromine;
$(C_1-C_4)$-alkoxy or hydrogen;

$X^4$ is cyano;
fluorine;
chlorine;
bromine or hydrogen;

$Y^1$ is hydrogen;
fluorine;
chlorine;
bromine;
methyl;
ethyl;
$(C_1-C_4)$-alkoxy;
$NHCOR^4$;
$NHCOOR^4$ or $NHSO_2R^5$ or $Y^1$ and $Y^3$, together with the benzene nucleus carrying them, form a naphtyl radical;

$Y^2$ is hydrogen;
fluorine;
chlorine;
methyl;
$(C_1-C_4)$-alkoxy or
$(C_1-C_4)$-alkoxy, which is substituted by $(C_1-C_4)$-alkoxy or hydroxyl;

$R^1$ is $(C_1-C_6)$-alkyl;

$R^2$ is $(C_1-C_6)$-alkyl or hydrogen;

$R^3$ is $(C_1-C_8)$-alkyl;
$(C_1-C_8)$-alkyl, which is substituted by chlorine, bromine, cyano, hydroxyl, $(C_1-C_8)$-alkoxy or phenoxy; phenyl;
$(C_3-C_5)$-alkenyl;
cyclopentyl;
cyclohexyl;
benzyl or $(C_1-C_8)$-alkyl, the hydrocarbon chain of which is interrupted by 2 or 3 oxygen atoms;

$R^4$ is phenyl;
$(C_1-C_4)$-alkyl;
$(C_1-C_4)$-alkyl, which is substituted by chlorine, bromine, $(C_1-C_4)$-alkoxy, cyano, hydroxyl or phenyl; and $R^5$ is $(C_4-C_6)$-alkyl.

2. The process according to claim 1, wherein D is a radical of the formula II and $X^1$ is hydrogen, chlorine, bromine or methylsulphonyl;
$X^2$ is nitro;
$X^3$, $X^4$, $Y^2$ and $Y^3$ are hydrogen; and $Y^1$ is hydrogen, methyl, methoxy, ethoxy, $NHCOR^4$ or $NHCOOR^4$.

3. The process according to claim 1, wherein D is a radical of the formula II and $X^1$ is nitro;
$X^3$ is chlorine, bromine, $(C_1-C_4)$-alkylsulphonyl, di-$(C_1-C_4)$-alkylsulphonyl, $(C_1-C_4)$-alkylaminocarbonyl, di-$(C_1-C_4)$-alkylaminocarbonyl, $(C_1-C_4)$-alkylcarbonyl or phenylcarbonyl;
$X^3$, $X^4$, $Y^2$ and $Y^3$ are hydrogen; and $Y^1$ is hydrogen, methyl, methoxy, ethoxy, $NHCOR^4$ or $NHCOOR^4$.

4. The process according to claim 1, wherein D is a radical of the formula II and $X^1$ and $X^4$ are cyano;
$X^3$ is hydrogen, $(C_1-C_4)$-alkyl, $(C_1-C_1-C_4)$-alkoxy, chlorine or bromine;
$X^3$, $Y^2$ and $Y^3$ are hydrogen; and
$Y^1$ is $NHCO(C_2-C_4)$-alkyl or $NHCOO(C_2-C_4)$-alkyl.

5. The process according to claim 1, wherein D is a radical of the formula II and $X^1$ and $X^3$ are nitro;
$X^3$ and $Y^2$ are hydrogen;
$X^4$ is hydrogen, chlorine or bromine; and
$Y^1$ and $Y^3$, together with the benzene nucleus carrying them, are a naphthyl radical.

6. The process according to claim 1, wherein D is a radical of the formula II and $X^1$ is hydrogen, chlorine or bromine;
$X^2$ is nitro;
$X^3$, $X^4$, $Y^2$ and $Y^3$ are hydrogen;
$Y^1$ are $NHCOR^4$;
$R^1$ and $R^2$ are methyl, and
$R^3$ is $(C_4-C_6)$-alkyl.

7. The process according to claim 1, wherein the process is carried out under NT conditions in an aqueous dye liquor at temperatures of between about 120° C. and about 140° C. in a dyeing autoclave.

8. The process according to claim 1, wherein said pK is about 9 to about 10.

9. The process according to claim 7, wherein said pH is about 9 to about 10.

10. The process according to claim 1, wherein there are employed two dyestuffs of the formula I in which D is 5,6- or 6,7-dichlorobenzothiazol-2-yl or 6-nitrobenzothiazole-2-yl.

11. The process as claimed in claim 1 wherein said polyester is polyethylene glycol terephtalata.

12. The process as claimed in claim 1 wherein said polyester-containing material is a mixture of polyesters and polyamides.

* * * * *